United States Patent [19]
Sarkisyan

[11] Patent Number: 5,946,850
[45] Date of Patent: Sep. 7, 1999

[54] CRAB TRAP

[76] Inventor: Peter Sarkisyan, 2775 Dawn La., Custer, Wash. 98240

[21] Appl. No.: 08/939,593

[22] Filed: Sep. 29, 1997

[51] Int. Cl.⁶ .................................................... A01K 69/08
[52] U.S. Cl. ................................................................ 43/100
[58] Field of Search .............................. 43/100, 102, 103, 43/105, 104

[56] References Cited

U.S. PATENT DOCUMENTS

| | | | |
|---|---|---|---|
| 605,834 | 6/1898 | Albury | 43/100 |
| 991,740 | 5/1911 | Mournian . | |
| 2,163,973 | 6/1939 | Benca et al. | 43/100 |
| 2,530,449 | 11/1950 | Bush | 43/102 |
| 2,760,297 | 8/1956 | Buyken | 43/105 |
| 3,440,758 | 4/1969 | Prince | 43/100 |
| 3,740,892 | 6/1973 | Cox et al. | 43/100 |
| 3,772,818 | 11/1973 | Gardina | 43/100 |
| 4,184,283 | 1/1980 | Wyman | 43/102 |
| 4,411,092 | 10/1983 | Lalancette | 43/100 |
| 4,509,288 | 4/1985 | Shepherd | 43/102 |
| 4,864,770 | 9/1989 | Serio | 43/100 X |
| 5,168,653 | 12/1992 | Wyman et al. | 43/100 |
| 5,771,627 | 6/1998 | Mattson et al. | 43/100 |

FOREIGN PATENT DOCUMENTS 368686 of 0000 United Kingdom .

*Primary Examiner*—Robert P. Swiatek
*Attorney, Agent, or Firm*—Robert B. Hughes; Hughes & Schacht, P.S.

[57] ABSTRACT

A crab trap shaped like a star formed from generally curved segments apexes of the star. These curved segments define the shape of the side walls of the trap which gently converge to a entrance tunnel and opening that leads to the interior of the trap. Each opening has a one-way gate so that the crustacean can enter but cannot escape from the trap. With the exception of the apexes, if the crustacean contacts any part of the side wall of the trap, the gentle curve of that segment of the side wall will urge the crustacean toward the entrance tunnel for that portion of the trap. An access door is provided in the top of the trap that is held closed by a spring-loaded lock finger. To open the access door, the spring-loaded lock finger is retracted and the access door is pulled open by hand or by the resilient nature of the netting that surrounds the frame of the trap. The crab trap also includes a number of escape rings that are sized according to local fishing regulations to permit immature crabs to escape the trap while retaining the mature crustaceans. These escape rings can easily be changed for using the traps in different jurisdictions with different size restrictions.

20 Claims, 13 Drawing Sheets

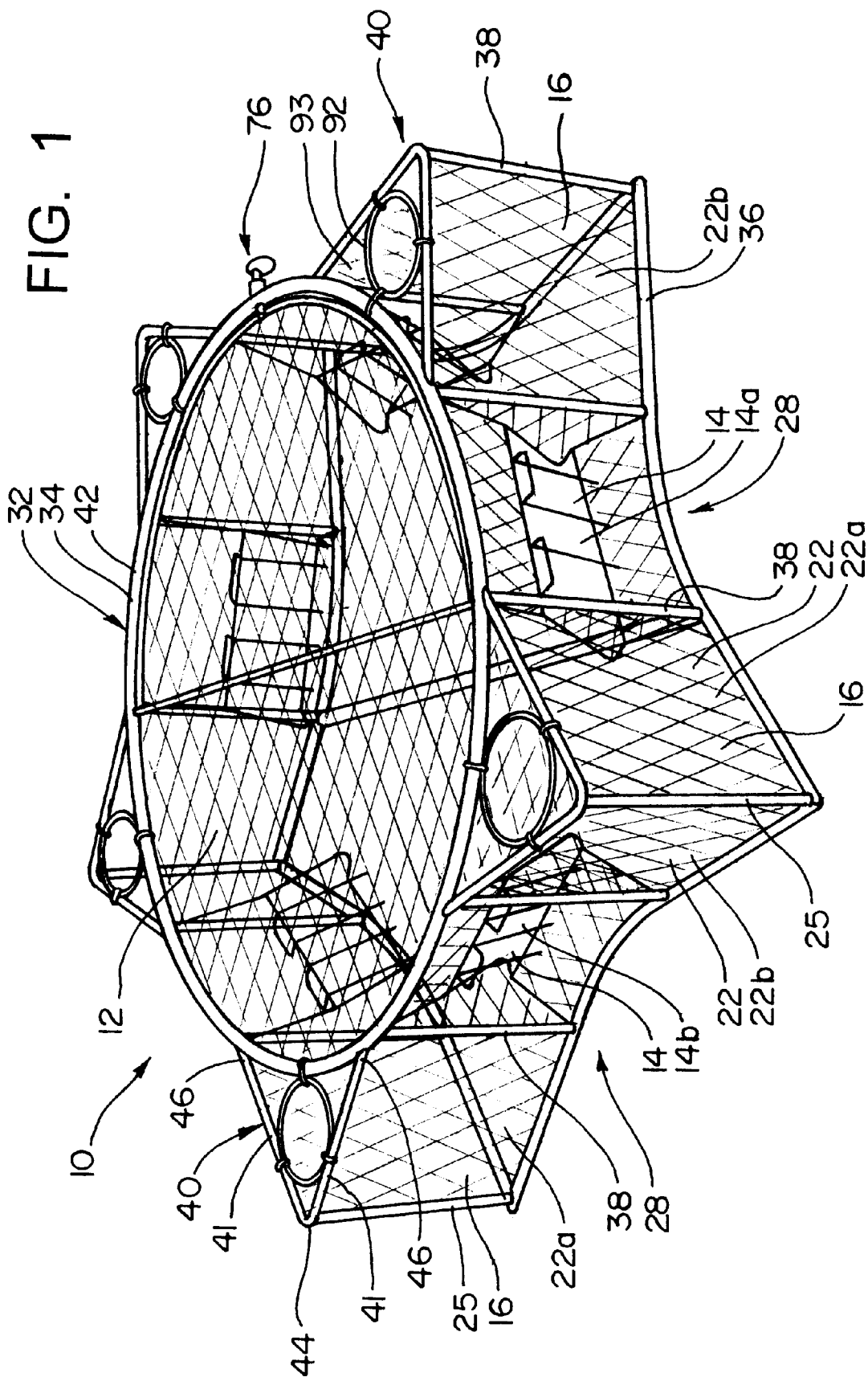

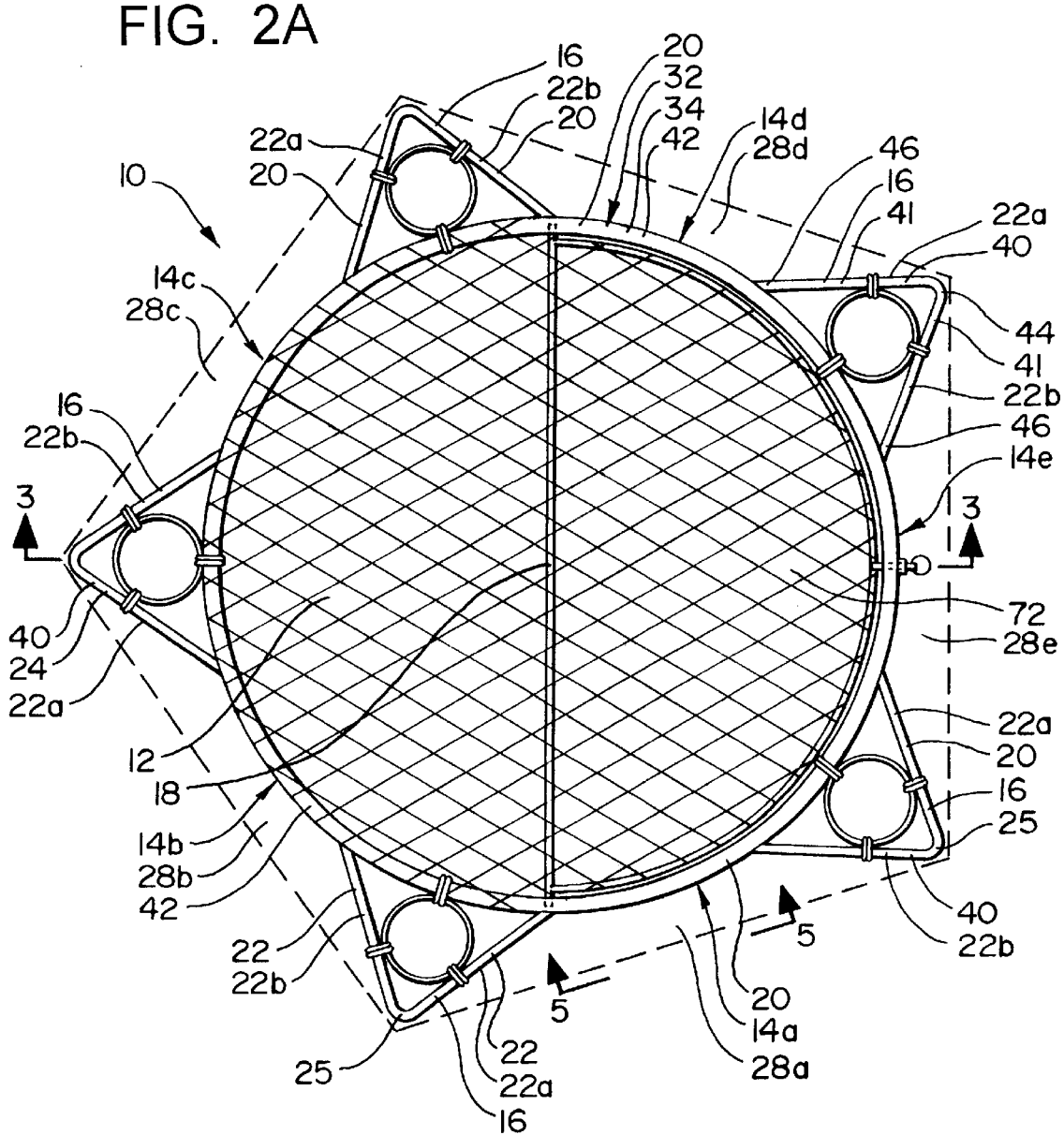

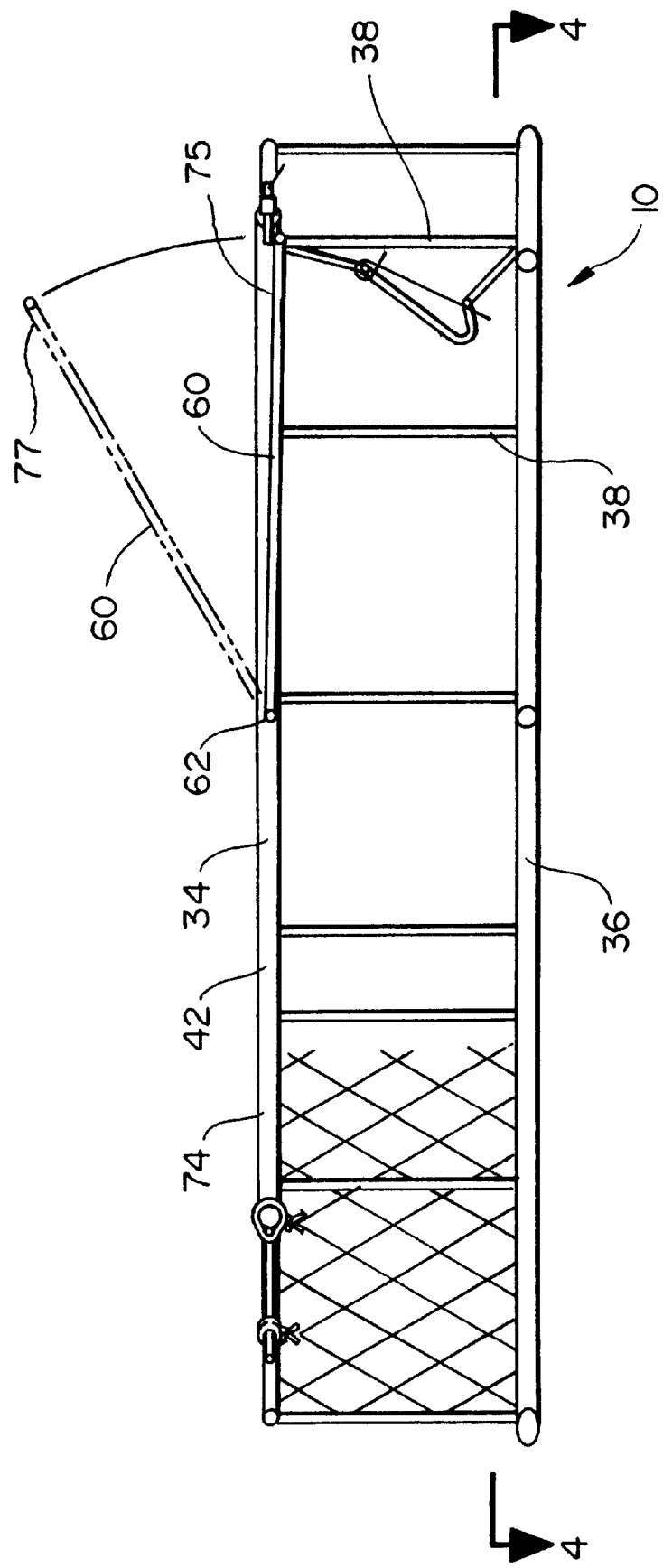

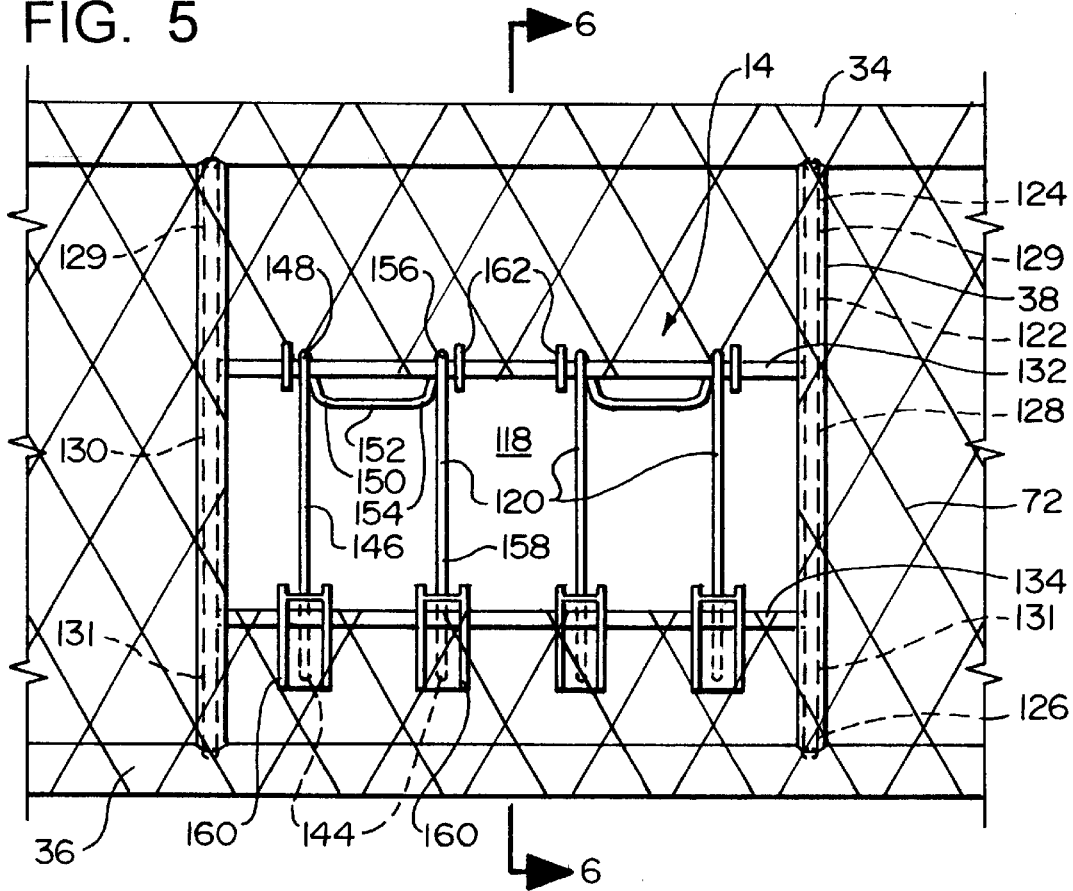
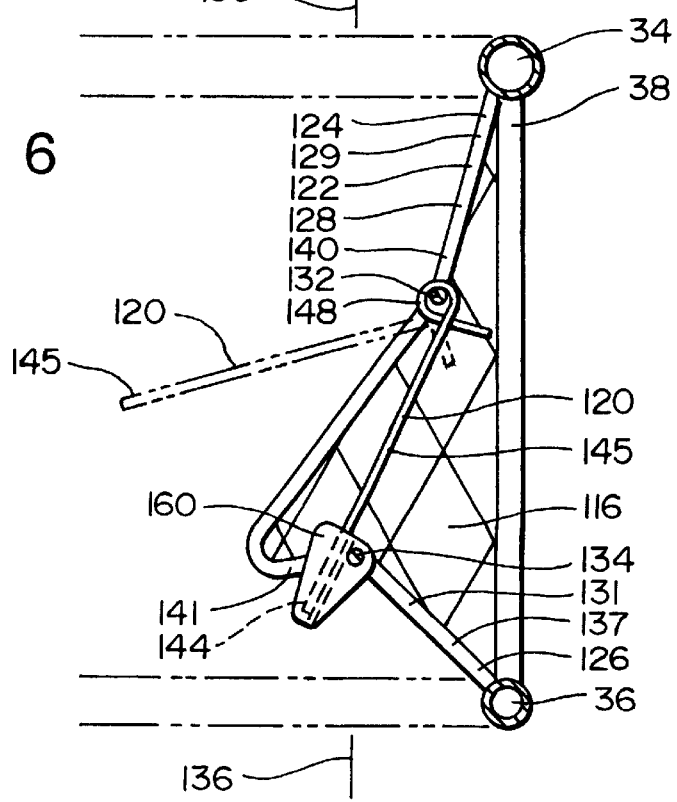

CRAB TRAP

BACKGROUND OF THE INVENTION

1. Field of the Invention

This invention relates generally to the field of crab traps, and more particularly to a commercial crab trap that is uniquely configured in the shape to increase the number of crabs caught by diverting the crabs toward the gate of the trap.

2. Background Art

Commercial crab harvesting involves the use of many expensive crab traps that are taken out to sea, lowered to the ocean floor where their location is marked with a floating buoy, and left to accumulate crabs. The fishing vessel returns after a couple of days, hopefully locates the buoys that mark the crab traps, and hoists the crab traps aboard to retrieve the catch.

Traditional commercial crab traps comprise a frame that is covered by a wire mesh. They will also typically have some type of one-way gate that the crab can crawl through to reach the bait inside the trap and an access door that is used to load the trap with bait and to remove the catch once the crab trap is retrieved. The most common crab traps used by commercial crab harvesters are shaped either like a rectangular box as is shown in U.S. Pat. No. 4,184,283 (Wyman), or a circular cage like that shown in U.S. Pat. No. 2,760,297 (Buyken). Generally, the one-way gates are either positioned in the center of one or more of the side walls of the rectangular shaped traps, or they are equally spaced around the circumference of the circular shape traps.

A commercial crab fishing vessel can set hundreds of crab traps at any one time. Each of these crab traps must be filled by hand with bait and also emptied of their catch by hand. The current practice is to fill the crab traps through access doors that are secured shut by using a heavy rubber strap with a hook on its end (similar to a bungee cord). An example of this type of strap is shown in U.S. Pat. No. 4,509,288 (Sheperd). To bait the trap the rubber strap is stretched by hand until the hook can be pulled free and the rubber strap is retracted. This allows the access door to be opened. The trap is then filled with bait, the access door closed, and the rubber strap is stretched by hand over the access door until the hook can grab the mesh under enough tension to keep the access door closed. Stretching this rubber strap by hand hundreds, if not thousands, of times over the course of a season often leads to repetitive motion injuries and considerable soreness and pain.

A commercial crab trap is typically made from iron that is often rubber coated. Iron is the material of choice because it is inexpensive and its weight helps to hold the crab trap in the same position on the ocean floor. Iron, however, is particularly susceptible to corrosive effect of the sea water which means that the crab traps rust over a few years of use and have to be replaced. Largely because crab traps are so often lost, the industry has been hesitant to make the crab traps from more expensive materials like stainless steel. Although marine aluminum (50/58) or (60/61) is relatively inexpensive and strong, the industry has not used it because it is not thought to be heavy enough to anchor the crab trap to the ocean floor.

A search of the patent literature has disclosed a number of other patents.

U.S. Pat. No. 4,411,092 (Lalancette) shows a trap in which there are walls which converge upwardly and laterally to an upwardly facing entrance opening in the area at which tee walls meet. The fish enter through the opening and are trapped. There is a door 9, for the removal of the caught fish.

U.S. Pat. No. 3,772,818 (Gardina) shows a crustacean trap in which there are funnel shaped elements 39, through which the crustacean enters. The crustacean is removed through door 44.

U.S. Pat. No. 4,730,892 (Cos et al) shows a lobster trap in which prey falls to the bottom of the structure after entering.

U.S. Pat. No. 3,440,758 (Prince) shows a collapsible crab trap in which there is an upper and lower solid ring that between the mesh sides are stretched. The mesh walls converge to points at which there are entrance openings.

U.S. Pat. No. 2,163,973 (Benca et al) show a fish trap in which there is an entrance funnel area 17, through which the fish enter.

U.S. Pat. No. 991,7450 (Mournian) shows a fish trap formed with converging walls at the entrance.

U.S. Pat. No. 605,834 (Albury) shows a fish trap in which there is an entrance on one side where the walls converge.

British Patent specification No. 368,686 shows a device to trap fish where there is a circular frame, and a source of light is positioned at the center of this frame. The fish are attracted to the light and swim toward the trap. The trap has six cone shaped (funnel shaped) wire members H-1, each of which defines a radially inwardly extending converging passageway. There is a downwardly extending net f closed by a drawstring g.

SUMMARY OF THE INVENTION

The arrangement of the present invention significantly improves the efficiency of the trap in capturing crabs. It is believed that crabs move in and out with the tide in generally straight lines. If a crab encounters an obstacle, it somewhat reluctantly moves around it and continues to drift in a straight line in the direction of the tide. With the crab traps currently in use, if the crab encounters the door of the trap it will probably enter and feed on the bait. However, if the crab encounters the side wall of a circular trap where there is no door, the crab will continue to follow the current and deflect outwardly away from the trap or it will climb on top of the pot. Similarly, if a crab encounters the side wall of a rectangular trap, it will move to one side or the other in order to continue swimming with the tide. If the crab moves toward the door it will probably enter. However, if the crab moves in the direction opposite the door it will be free of the trap and will continue to drift away with the tide.

In the present invention, the shape of the trap takes advantage of the crab's natural tendency to move with the tide in the direction of the least resistance. A crab that encounters the crab trap from any direction will encounter either the gate or a deflection wall that will guide the crab to the gate in the path of least resistance to the direction of the tide. Since the crab would have to back up against the tide to move away from the trap, it is more likely to move forwardly along the inward slant of the diversion walls toward the access opening and the inviting bait. It is important to emphasize that the shape of the crab trap means that any side surface of the trap that the crab encounters will slant inwardly toward one of the entrance gates. This means that all forward motion that the crab makes will move it closer to its capture.

While the crab trap of the present invention is intended for commercial use, it could easily be scaled to a manageable size for recreational use, it should also be understood that the crab trap can be used for the capture of other crustaceans such as lobsters and can be used in both salt and fresh water.

The crab trap of the present invention is adapted to be lowered into a body of water and rest on the floor of the body of water. The crab trap defines an enclosed containing area in which the crabs are contained.

The crab trap comprises a main frame having a center location and a perimeter. The main frame comprises a lower perimeter frame section adapted to rest on the floor of the body of water and extending around the containing area, an upper perimeter frame section positioned above the lower frame section and extending around the containing area, an interconnecting frame means interconnecting the upper and lower frame sections.

There is a plurality of gates which are positioned at perimeter locations at spaced intervals around the perimeter of the main frame between the upper and lower frame sections and which provide access openings through which the crabs enter into the containing area.

There is a plurality of diversion wall sections that are positioned intermittently between the gates. Each of the wall sections comprises a pair of generally upright portion, said wall portions of each pair having a radially outward end portion connected to one another and radially inward end wall portions positioned proximate to an adjacent gate.

In the preferred form, the two wall portions of each diversion wall sections diverge from one another in a radially inward direction in a manner that each wall portion of one wall section on one side of the related gate forms with an adjacent wall portion of an adjacent wall section of the other side of the related gate a diverting region where the two wall portions on opposite sides of that gate provide with that gate a diverting and deflecting location so that the crabs traveling into that diverting and collecting location are directed to the related gate to enter that gate and be retained in the collecting area.

The two wall sections of the diverting regions extending toward the related gate and from an exterior angle with one another of less than 180°, and this exterior angle is in the preferred form at least as great as about 90°. A preferred range would be about between about 20° to 60°. The crab trap has a center portion and a radial dimension from the center location to an edge portion of the main frame. The diversion wall sections extend radially outwardly from the mid-location a distance which is between about one and one quarter of the radial dimensions to twice the radial dimension. In the third range, the diversion wall sections extend outwardly from the central location a dimension between about one and one third to one and two thirds of the radial dimension.

The wall sections of each diversion wall section extend outwardly from one another at an angle of between 0 and 90°. A preferred angle is between 30° and 90°, and at least about 45°.

There is an access door pivotally mounted about an access extending across the upper perimeter frame section, and the access door is spring loaded to move from a closed position to an open position. Latch means holds the access door in its closed position. There is a metal screen extending across the upper perimeter frame and is placed, and connects to, the access door to extend over the access door. The metal screen is spring loaded in tension so as to urge the access door to its open position.

Also, the trap crab comprises an escape ring which is desirably mounted between a pair of wall portions of one of the diversion wall sections. In the preferred form, the escape ring is positioned at one of the diversion wall sections so as to be located radially outwardly of the main frame.

Desirably, the crab trap comprises at least four diversion wall sections and no more than eight diversion wall sections. A more preferred range is between about five to seven diverting wall sections.

In the method of the present invention, the crab trap is provided as described above, and is lowered to the floor of the body of water. The crab trap is arranged so that no matter which way the current is directed, there is provided a substantially large frontal area where the collecting region is positioned to divert the crab toward the related gate.

Other features will become apparent from the following detailed description.

BRIEF DESCRIPTION OF THE DRAWINGS

FIG. 1 is an isometric view of the preferred embodiment of the present invention.

FIG. 2A–C are plan views showing the top of the present invention.

FIG. 3 is a side elevational cross sectional view of the present invention taken along line 3—3 of FIG. 2.

FIG. 5 is a partial side-elevational view of the present invention showing one of the entrances of the crab trap as viewed from line 5—5 shown in FIG. 2.

FIG. 6 is a partial cross-sectional view of the entrance shown in FIG. 5 and taken about line 6—6 in that figure.

DESCRIPTION OF THE PREFERRED EMBODIMENTS

Figure 2B:
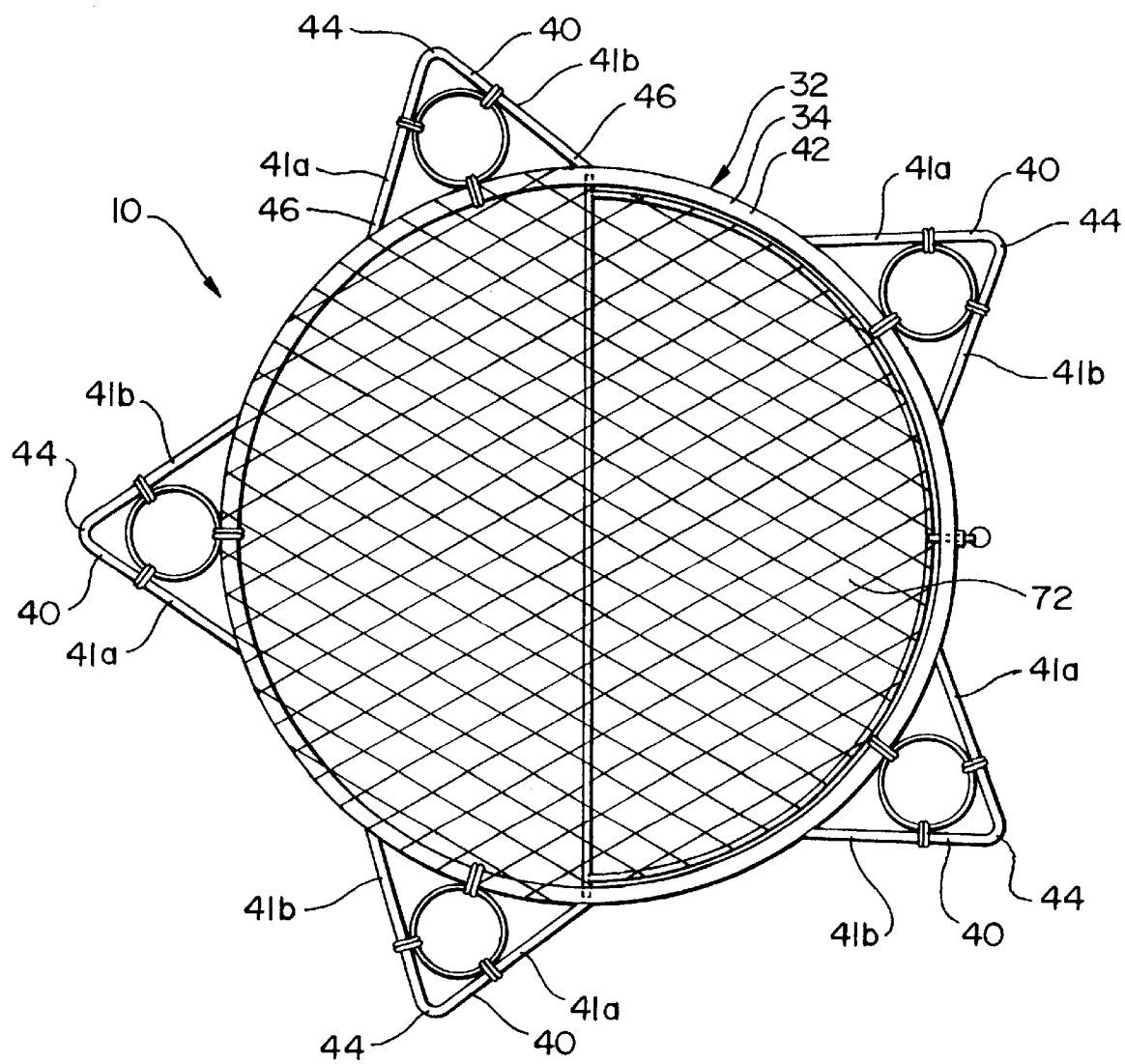

The preferred embodiment of the crab trap 10 of the present invention is shown in the isometric view of FIG. 1, and comprises a main containing portion 12 where the crabs are held until they can be retrieved, a plurality of gates 14 that allow the crab to enter the main containing portion 12 but not to leave, and a plurality of diversion sections 16 which will be described more fully later herein, that guide the crabs toward the gates 14. For convenience of description, the crab trap 10 shall be considered as having a center location 18 and a perimeter 20.

The gates 14 are positioned along the perimeter 20 of the crab trap 10 at equally spaced intervals. Each diversion section 16 comprises a pair of diversion wall portions 22 that are substantially vertically aligned. Each pair of diversion wall portions 22 are connected to each other at a juncture location 25 from which they extend radially inwardly and divergently. Each gate 14 and its two adjacent diversion wall portions 22a and 22b form a diversion and collecting region 28. (See FIG. 1).

Referring to FIG. 2b, the crab trap 10 has a main frame 32 that comprises an upper frame member 34 and a lower frame member 36 that are joined together by a plurality of interconnecting vertical frame members 38. The upper frame member 34 comprises a plurality of radially extending V-shaped frame projections 40 that are attached to a generally circular frame member 42. The V-shaped frame projections each comprise two straight frame members 41 that are joined together at an outer end 44 (the vertex of the V-shape)

and the inner ends 46 (the distal ends of the V-shape) are joined to the circular frame member 42. As can be seen in FIG. 2, the addition of these V-shaped frame projections 40 to the circular frame member 42 create an upper frame member 34 that has a configuration resembling a star shape.

Figure 4:
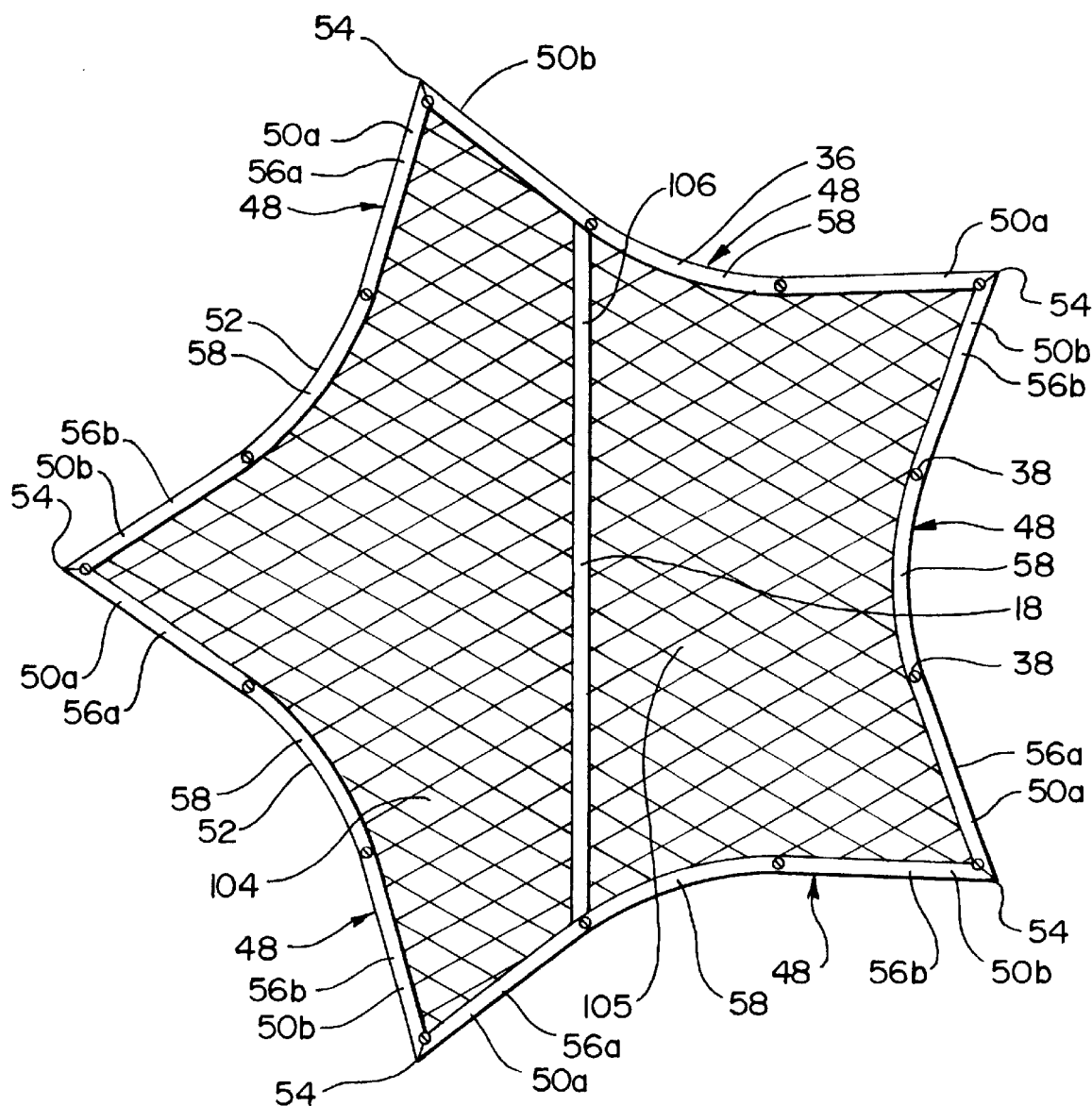
FIG. 4 is a plan view showing the bottom of the present invention.

The lower frame member 36 is shown in FIG. 4 and comprises a plurality of inwardly curved frame members 48 that are joined end 50a to end 50b with their concave side 52 facing outwardly relative to the center 18 of the crab trap 10. Assembled in this manner, the lower frame member 36 has a general star-shaped configuration that approximates the general star shape of the upper frame member 34 but is not identical to it. The star shapes of the upper frame member 34 and the lower frame member 36 are the same in that the apex 44 of the V-shaped frame portions 40 are positioned directly above the apex 54 of the points of the star-shaped lower frame member 36 when the main frame portion 32 is assembled. Each curved frame member 50 has two generally straight portions 56a and 56b and a curved portion 58. These straight portions 56a and 56b of the arcuate frame members 50 lie directly below a corresponding member 41a an 41b of the V-shaped projection 40.

The curved frame sections 48 are preferably made from a tubular metal that is filled with a relatively heavy and inexpensive anchor metal such as lead. The additional of the anchor metal to the curved frame sections 48 produces a heavy base for the crab trap 10 which assists the crab trap 10 to sink the ocean bottom in the proper upright orientation and to keep the crab trap 10 in that location until it is retrieved. The addition of the anchor metal also protects the trap 10 against the effects of electrolysis.

Figure 2C:
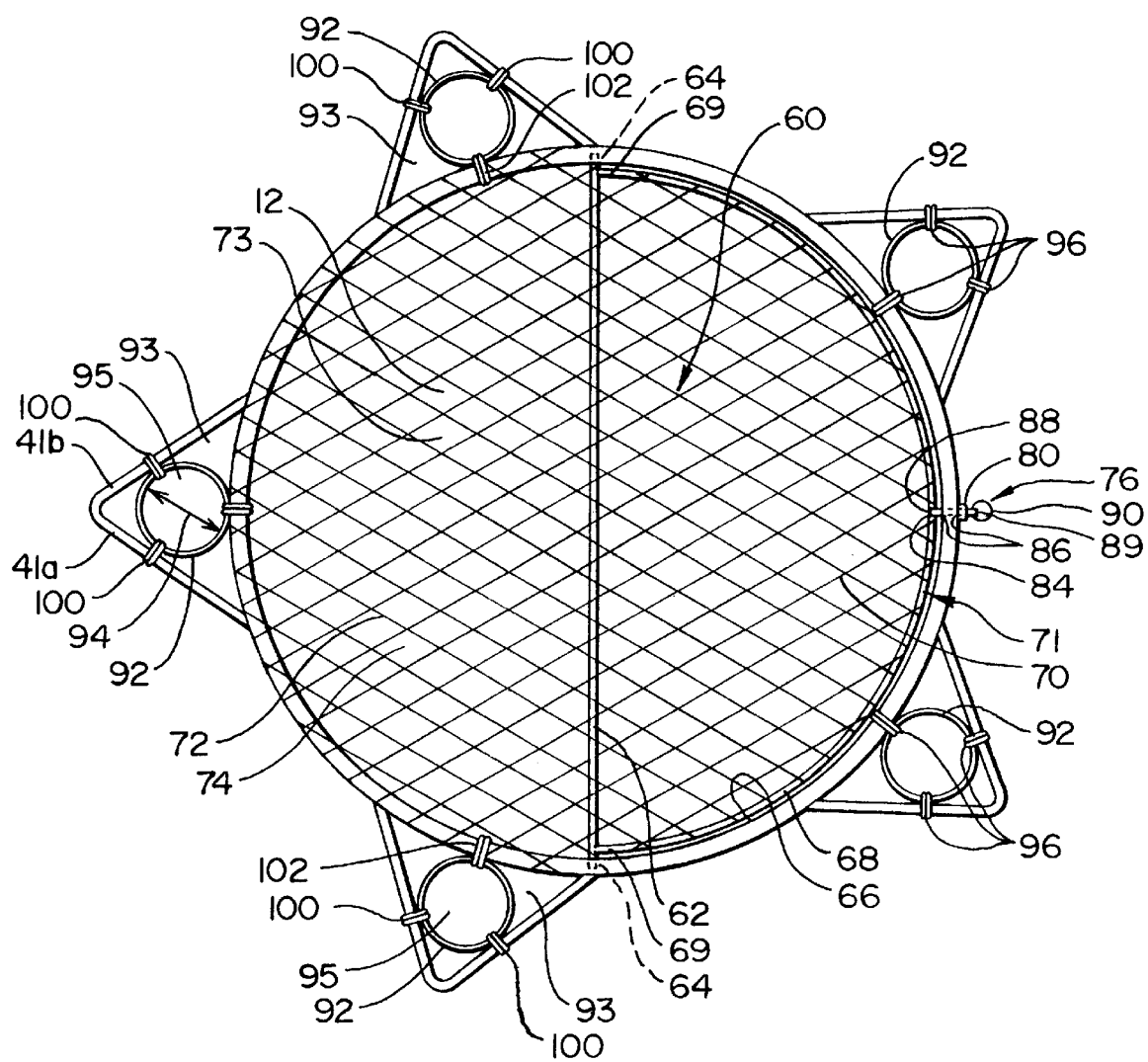

As shown in FIG. 2C, a semi-circular access door 60 is hinge mounted to the circular frame member 42 by means of a diametrically aligned spindle member 62 that is mounted for rotational movement in holes 64 formed in the interior circumference 66 of the circular frame member 42. An arcuate door frame member 68 is joined at either end 69 to the spindle member 62 to form the frame 71 of a semi-circular shaped access door 60. The mesh section 70 that contains the access door 60 and the circular frame member 42 is preferably made from a resilient wire mesh 72. As shown in FIG. 2, the wire mesh 72 extends over the portion 73 of the circular frame member 42 that is behind the spindle member 62 of the access door 60. The portion 70 of the wire mesh 72 that covers the access door 60 is connected under directly to the arcuate door frame member 68. Preferably, the wire mesh 72 is attached so that it is under some tension when the access door 60 is in its closed position 75 (FIG. 3). This resilient nature of the wire mesh 72 and this tension will tend to pull the access door 60 upwardly about the spindle member 62 to an open position 77 that is shown from the side in FIG. 3. The tension from the resilient wire mesh 72 holds open the access door 60 while the crab trap 10 is filled with bait or the crabs are removed. Of course, the access door 60 can also be folded back to rest on the wire mesh covering the rear portion 74 of the circular frame member 42.

Returning to FIG. 2C, while in use catching crabs, the access door 60 is held closed by a latch assembly 76 that is preferably mounted on the circular frame member 42 opposite the spindle member 62, or approximately half way along the circumference 76 of the arcuate door frame member 68. The latch assembly 76 comprises a housing 80 that is attached to the circular frame member 42 opposite the access door 60. This fixed housing 80 contains a spring that is attached to a slidably mounted lock rod 84. The locking end 88 of the lock rod 84 extends through a pair of holes 86 defined in the circular frame member 42 and extends over the arcuate door frame member 68. Attached to the opposite end 89 of the lock rod 84 is a handle 90. While the access door 60 is in its closed position 75, the resilient wire mesh 72 is urging the access door 60 upwardly, but the locking end 88 of the latch assembly 76 restrains this upward movement. To release the access door 60 into its open position 77, the handle 90 of the latch assembly 76 is pulled in the direction opposite the latch access door 60 which causes the lock rod 84 to slide against the tension of the spring until the locking end 88 of the latch assembly 76 no longer restrains the arcuate frame member 68 of the access door 60.

An escape ring 92 is mounted in the generally triangular region 93 between the two V frame members 41 and the circular frame member 42. The triangular region 93 is not covered with the wire mesh 72. The escape ring 92 has a diameter 94 that corresponds to the minimum size crab that local regulations legally allow the crab harvester to keep. Crabs that are smaller than this minimum size can easily escape the crab trap 10 by crawling through the open area 95 in the escape ring 92. This is advantageous because the undersize crabs will just take up space in the main containing portion 12 and because it avoids the effort involved in segregating the undersize crabs and throwing them back into the water. Larger crabs will not fit through the escape rings 92 and will be retained in the trap.

The escape rings 92 are tied to points 100 on the V frame members 41 and to a point 102 on the circular frame member 42 using a cord 96 that is designed to rot while in the water. If the crab trap 10 is lost or otherwise not retrieved, the cord 96 will rot over the course of a few months which will release the escape ring 92 from the main frame 32 of the crab trap 10 and permit the mature crabs to escape through the triangular region 93. This is environmentally desirable because the crabs in a lost crab trap 10 can escape to either be caught again in another trap 10 or to breed more crabs to be caught at a later time.

Another advantage of using rot cord 96 to attach the escape rings 92 to the main frame portion 32 is that different size escape rings 92 can easily be substituted for those already in place. Different jurisdictions have different regulations for the minimum size crabs that the fisher can keep. By changing the size of the escape rings 92, the crab trap 10 can be used in all of these jurisdictions by making this easy substitution. The escape ring 92 is tied to the frame at preferable three points 100, 102, as is described above. The triangular region can support a wide variety of different size escape rings 92 by tying the escape ring 92 to the three points 100, 102, discussed above.

Referring to FIG. 4, a heavier gauge wire mesh 104 or metal mesh plate 104 can be attached to the lower frame member 36 instead of the wire mesh 72 used on the rest of the crab trap 10. This heavier metal mesh 104 has the advantages that it adds additional torsional stability to the lower frame member 36, it adds additional weight to the lower frame member 36, and because of it adds durability to the portion 105 of the crab trap 10 that will take the most abuse over its useful life.

The lower frame member 36 also has a cross member 106 that is connected between two of its arcuate frame sections 48 that adds torsional stability. The primary purpose of this cross member 106, however, is to serve as a container 107 for a filling of metal 108 that is sacrificed to protect the main frame 32 from the effects of electrolysis and corrosion. The cross member 106 is made of tubular metal having a longitudinal channel 110 that exposes the sacrificial metal 108 to the water. The cross member 106 is hermetically welded to the trap 10. Examples of the type of sacrificial metal 108 that may be used include zinc or lead.

The resilient wire mesh 72 extends from the upper frame member to the lower frame member following the star shaped contour of the crab trap 10. There is no wire mesh 72 in the triangular region 93 containing the escape ring because the intent is to allow the crabs to escape if the crab trap 10 is left in the water long enough for the escape ring 92 to detach from the upper frame member 34.

As detailed in FIG. 5, the gate 14 comprises an entry tunnel 116, an opening 118, and one-way obstruction means 120. Between each pair of diversion walls 22a and 22b is an entry tunnel 116 that has a funnel-like shape. The funnel shape of entry tunnel 116 is defined by the wire mesh 72 that is stretched over and attached to a hoop 122 that defines the shape of the entry tunnel 116 and the opening 118 to the main containing portion 12. The hoop 122 is attached at its upper end 124 to the upper frame member 34 and at its lower end 126 to the lower frame member 36. The hoop 122 comprises a right and a left support member 128 and 130 that are joined near their top ends 129 by a horizontal upper support bar 132 and near their lower ends 131 by a horizontal lower stop bar 134. The upper support bar 132 and the lower stop bar 134 are not in the same vertical plane. The lower stop bar 134 actually resides in a vertical plane 136 that is behind the position of the upper support bar 132 and more toward the center of the crab trap 10. This is accomplished by bending the right and left vertical supports 128 and 130 into approximately the shape of an "L" with the top 124 of the "L" attached to the upper frame member 34, the upper support bar 132 attached in an upper portion 140 of the "L", the lower stop bar 134 attached near the vertex 141 of the "L" and lower end 137 attached to the lower frame member 36. However, this system is not obligatory for the crab trap.

The wire mesh 72 is stretched over the exterior surface of the hoop 122 and secured to it, leaving an opening 118 between the vertical support members 128 and 130 and the horizontal bars 132 and 134. Each opening 118 to the main containing portion 12 is blocked by a plurality of obstruction members 120 that are hinge mounted to the upper support bar 132 and which depend downwardly and across the opening 118. The lower portion 144 of the each obstruction member 120 rests against the lower stop bar 134 so that the obstruction member 120 is actually positioned downwardly and rearwardly toward the center 18 of the crab trap 10 when it is closed. In this closed position 145, the force of gravity keeps the obstruction members 120 in contact with the lower stop bar 134 and external forces such as gravity or currents are less likely to cause the obstruction members 120 to swing open, especially if the crab trap 10 is not resting in a level position on the ocean floor. When a crab enters the crab trap 10 it pushes these obstruction members 120 inwardly and upwardly to an open position 145. After the crab falls into the trap, the obstruction members 120 swing downwardly to rest on the stop bar 134 which does not permit the obstruction members 120 to be push forwardly by the crab so that it can escape. Obviously, the specific arrangement of the doors could be modified, and other arrangements could be used.

In the preferred embodiment, the obstruction members are comprised of a single piece of wire that is formed into a first downwardly extending tine 146, a first 360° degree loop 148, a first 90 degree bend 150 a slight distance (x) away from the loop 148, a central portion 152, a second 90 degree bend 154, a second 360 degree loop 156 at a distance (x) from the second bend 154, and then a second downwardly depending tine 158. The first 148 and second 156 loops form a hinge with the upper support bar 132 resident inside them. The first 146 and second 158 tines depend downwardly and rearwardly until the distal end 144 of each tine lies in a retaining cup 160 that has been attached to the stop bar 134. The obstruction member 120 is maintained in position on the upper support bar 132 by a pair of stop members 162 that are mounted on the upper support bar 132 on either side of the first 148 and second 156 loop of the obstruction member 120. The stop members 160 and 162 help prevent the crab from pushing the obstruction member 120 to the side so that it can escape the crab trap 10.

The crab trap 10 is preferably made from marine grade aluminum, although a rubber coated iron would also suffice. Aluminum has the advantages of corrosion resistance, light weight, fabrication ease, and cost. It also makes the upper part lighter than the bottom for stability in lowing the trap. Most of the weight is in the bottom 1 inch.

Figure 8:
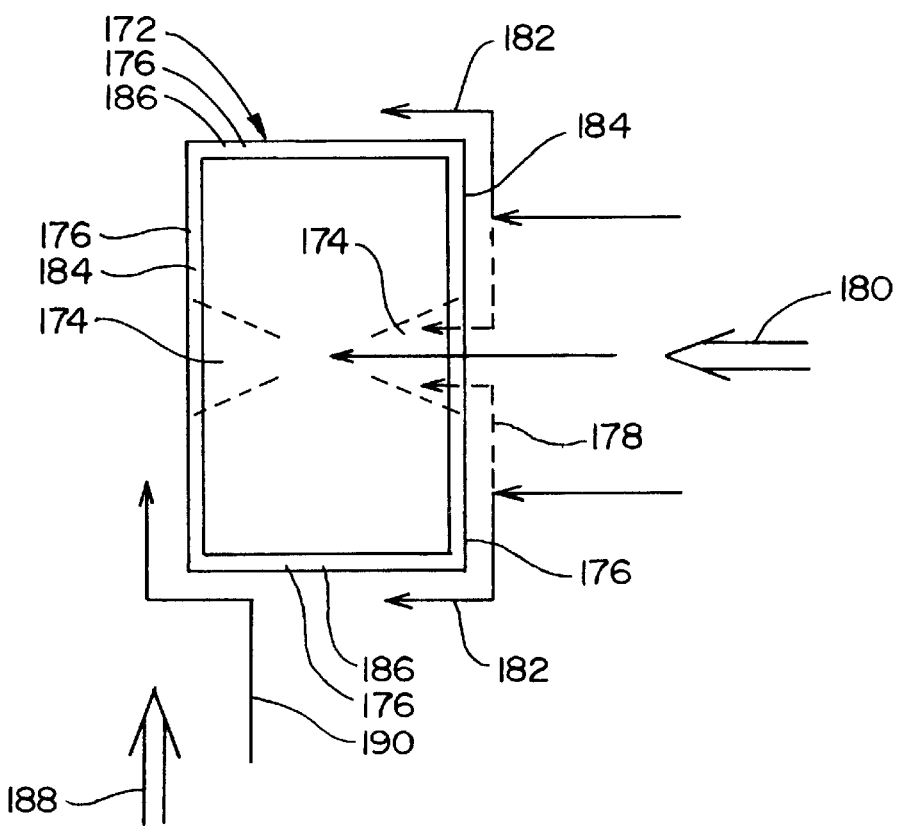
FIG. 8 is a schematic plan view looking down on the top of a rectangular crab trap known in the art.
Figure 9:
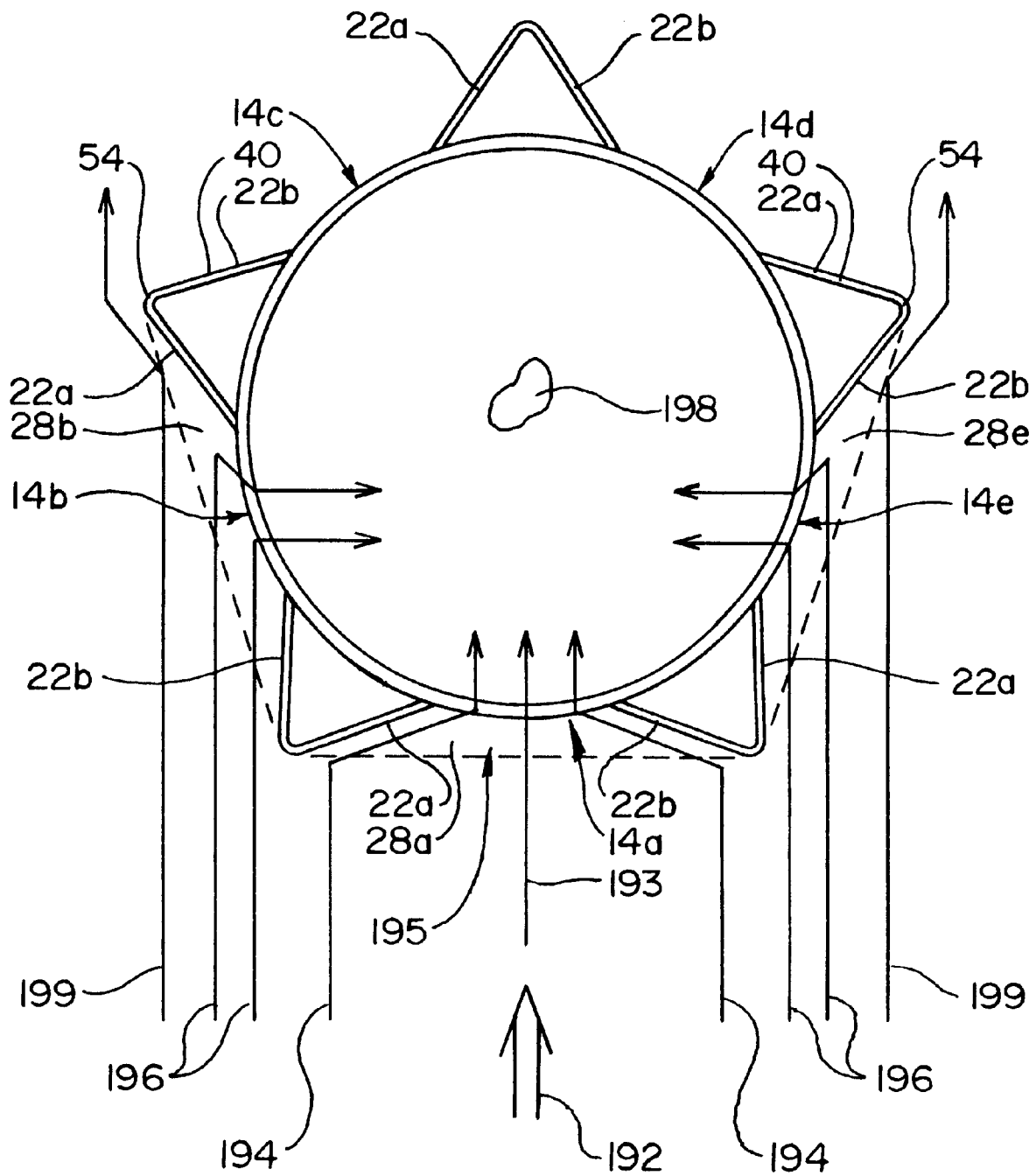
FIGS. 9–13 are a series of schematic plan views looking down on a crab trap of the present invention.

The theory of operation of the crab trap 10 will now be discussed with reference to FIGS. 7–9. It is believed that crabs travel in and out with the tide following the direction of the current in a more or less straight line. When the crab encounters food it will stop for a meal and then continue to swim with the current. Further, it is believed that crabs are reluctant to swim against the current, so that it is unlikely that they will fight the current even to reach a meal that it has passed. The same is believed to be true when the crab encounters the traps currently being used in the art.

Figure 7:
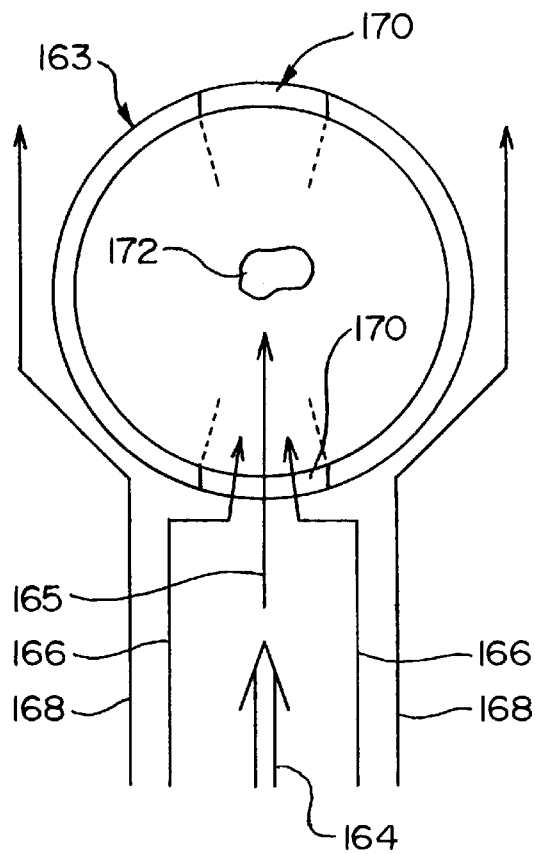
FIG. 7 is a schematic plan view looking down on the top of a round crab trap known in the art.

In FIG. 7, a crab trap 163 (as is known in the art) is shown schematically. The large arrow 164 indicates the direction of the current and the small arrows indicate the approximate travel path of the crab. If the crab happens to encounter the gate 170 of the trap 163 while it is swimming with the current 164, the crab will probably enter the trap 163 to partake of the bait 172 (arrow 165). If the crab encounters the trap 163 near the gate 170 it may even move a bit against the current 164 to enter the trap 163 (arrows 166). It is believed, however, that there is a limit to the amount of effort the crab will make to find the gate 170, and that the further the crab is from the gate 170 when it encounters the trap 163, the more likely it is to simply deflected off the trap 163 as it continues to move with the current 164 (arrows 168).

If the crab encounters the gate 174 of a rectangular style trap 12 (as is shown schematically in FIG. 8), the crab will likely enter the trap 172. If the crab finds one of the walls 176 of the trap 172 it is theorized that it will move sideways to avoid that obstruction and it will either find a gate 174 and enter it, as shown with arrow 178, or it will move away from the trap 172 or climb over the trap 172 where it can continue swimming with the tide 180(arrows 182). Which path the crab chooses is mostly a matter of chance. Since most rectangular crab trap 10s have gates 174 only on two sides 184, if the crab encounters the rectangular trap at a side 186 that does not have a gate it will move to either end of the wall 186 and then continue on with the current 188 as shown with arrow 190 (the current heads in a different direction for this last example).

The present invention is based on the premise that the crab trap should be designed so that instead of being handicapped by the natural tendency of the crab to travel with the current, the present invention 10 takes advantage of it. The star shape of the crab trap 10 greatly increases the area of the crab trap 10 where the crab is likely to enter a gate 14 by following the path of least resistance against the current 192. As an example, the direction of the current is shown by the large arrow 192 in FIG. 9. Like traps currently in use, if the tide 192 brings the crab directly to a gate 14*a* it will probably enter (arrow 193). Unlike these traps, however, if the crab encounters either of the diversion walls 22*a* or 22*b* in the diversion and collecting region 28, it will move along the path of the least resistance to the current 192 which is inwardly along the diversion walls 22*a* or 22*b* toward the gate 14 and into the trap 10 (arrows 194).

In this example, the primary diversion and collecting zone 14*a* is within the area defined by the diversion walls 22*a* and 22*b* leading to the gate 14*a* on the crab trap 10 that is roughly perpendicular to the direction of the current 192. However, the capture zone 195 for the crabs also includes a large portion of the diversion and collection regions 28*b* and 28*e* of the two gates 14*b* and 14*e* that are adjacent to the primary gate 14*a*. As shown by arrows 196, if the crab passes the primary diversion and collecting zone 28*a* it may reach one of the secondary gates 14*b* or 14*e* and enter through it. The crab may actually move down the diversion wall 197 in the secondary diversion and collecting region 28*b* or 28*e* if the bait 198 catches its interest. However, like the traps shown in FIGS. 7 and 8, at some point the crab will be unwilling to move against the current 192 and will instead move toward the apex 54 of the V-shaped projection 40 and continue on its way (arrows 199).

It should be noted that because of the symmetrical nature of the trap 10, the crabs will be caught during both the incoming and outgoing tide regardless of the way the trap 10 falls when lowered to the ocean floor.

Reference will now be made to FIGS. 10–13 to discuss further various features of the present invention. As indicated previously, these drawings are to a reduced scale, and the various dimensions for purposes of comparison are given in the following discussion in millimeters, and relate directly to the design as shown in FIGS. 10 through 13.

Figure 10:
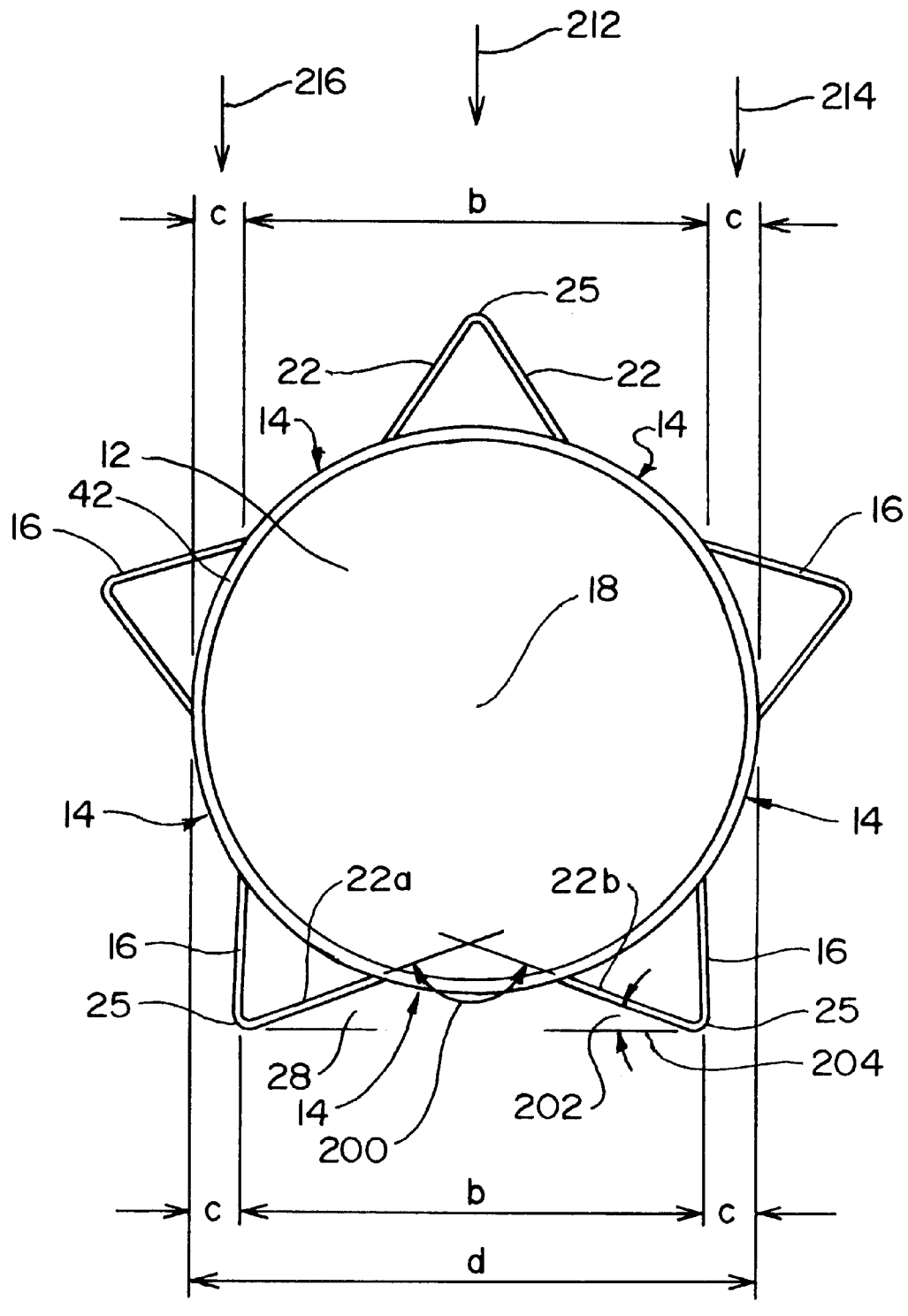

With regard to the angular orientation of the diversion wall portions 22, reference is made to FIG. 10 where the crab trap 10 is shown in plane view somewhat semi-schematically. The vertical planes occupied by the two diversion walls 22*a* and 22*b* meet when projected further radially inwardly make an angle, indicated at 200. This angle 200 should be less than 180°, so that the diversion walls 22*a* and 22*b* converge radially inwardly so as to properly direct the crabs into the gate 14. In the present embodiment, the preferred angle 200 is set about 140°, however, this angle 200 could be decreased to angles less than 140°. The angle 202 which is made by either or both of the diversion wall portions 22*a* and 22*b* mate with a line 204 drawn between the two juncture locations 25 of the two diverting section 16 must be greater than zero to provide the radial inward slant to lead the crabs toward the gate 14. In the preferred embodiment shown herein, this angle 202 is about 20°. However, this could be increased moderately, or possibly increased to a steeper angle.

With regard to optimizing the configuration in relative dimensions of the components of the crab trap, a number of factors have to be considered. First, the overall lateral dimensions and height dimensions of the crab trap have to be kept within reasonable limits so that these could be stored on the boat, and also handled by the fishermen with relative convenient. Yet, it is desirable that the containing portion 12 of the crab trap 10 have as large a volume as possible to maximize the amount of crabs which could be caught in any one fishing cycle. Further, there is the consideration of costs, in that the design cannot be such that it would substantially increase the costs of materials and labor in constructing the crab trap. Also, the structure must be sturdy, durable, and able to withstand substantial impacts on loads placed thereon.

In FIG. 10, there is shown a set of arrows 206, 208, and 210. These arrows 206–210 show the same direction travel of the crab traps as in FIG. 9, where the direction of travel of the crab trap is straight toward a gate 14, so that the path of travel is perpendicular to the gate 14. (This is the same as shown in FIG. 10). There is indicated at "b" the lateral dimension of the diversion and collecting region 28. The diameter of the circular main frame member 42 is indicated at "d" (the region inside this circular frame member 42 comprising the major part of the containing portion 12).

As shown in FIG. 10, the diameter "d" is about 77 millimeters, and the dimension at "b" is about 60 millimeters. Thus, the diversion and collecting region 28 has a lateral dimension which is about 80% of the total diameter of the circular main frame 42. In addition, as indicated earlier in this text, there are the two regions "c", which represent a path of travel where the crabs might be present in following the arrows indicated at 208 and 210 in FIG. 10. It is also quite possible that the crabs following the arrows 208 and 210 will pass just outside the adjacent juncture location 25 and enter into one of the gates 14.

Also shown in FIG. 10 are the three arrows 212, 214, and 216 showing possible paths of travel of the crabs when these paths of travel are parallel to a radial line extending from the center location 18 to a forward located juncture location 25. In this instance, the crab traveling in the middle location indicated by the arrow 212 will pass by the centrally location juncture location 25 and then enter into one or the other of the gates on opposite sides of the forward juncture location 25. Those crabs which are traveling in the paths of the arrows indicated at 214 or 216 will more likely pass around the two laterally projecting diversion section 16 and not enter into the crab trap 10. Again, as with the situation shown at the arrows 206–210, there is a central diverting and collecting region which has a lateral dimension which is about 80% of the total diameter of the main frame member 42.

Figure 11:
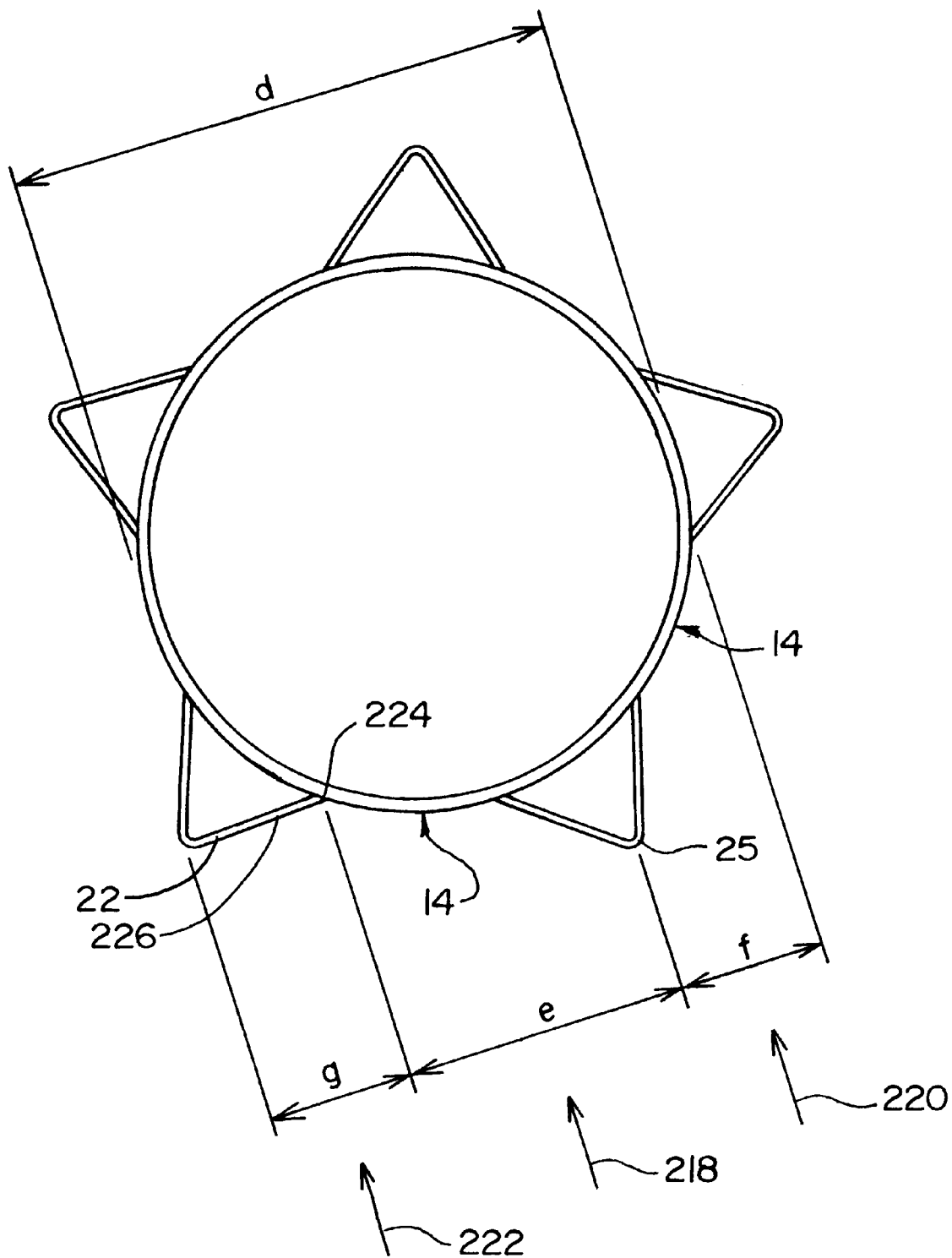

Now reference is made to FIG. 11 to analyze the situation where the path of travel of the crabs are along the arrows indicated at 218, 220 and 222, these being parallel paths which are half way between the two paths of travel indicated in FIG. 10. There is shown a lateral dimension "e" which extends from the most forward juncture location 25 to the far edge 224 of the more forward gate 14. This lateral dimension "e" represents a collecting zone where there is a higher likelihood of having the crabs enter the more forward gate 14.

In addition, there is the region indicated by the lateral dimension "f" in FIG. 11, where the gate aligned with the path defined by the arrow 220 is at a sharper angle, but yet in a position where crabs could enter. Then, there is the diverting wall 22, the planar orientation thereof (shown at 226) being perpendicular to the path as shown by the arrow 222. The crabs could be diverted possibly to the right or the left and it could be presumed that a certain percentage of these crabs would pass through the more forward gate 14. The lateral dimension of the collecting region "e" is 38 millimeters (about half of the dimension "d"), the lateral dimension "f", where there is still a reasonable likelihood of catching the crabs is 20 millimeters, while the dimension at "g" is 19 millimeters.

From the above discussion, it is apparent that with the configuration of this preferred embodiment of the crab trap 10, no matter how the crab trap is oriented with respect to the floor of the ocean current (and hence the path of travel of the crabs), there is a relatively large effective collecting area or areas where the crab would have a high likelihood or a reasonable likelihood of entering the adjacent gate 14.

Figure 12:
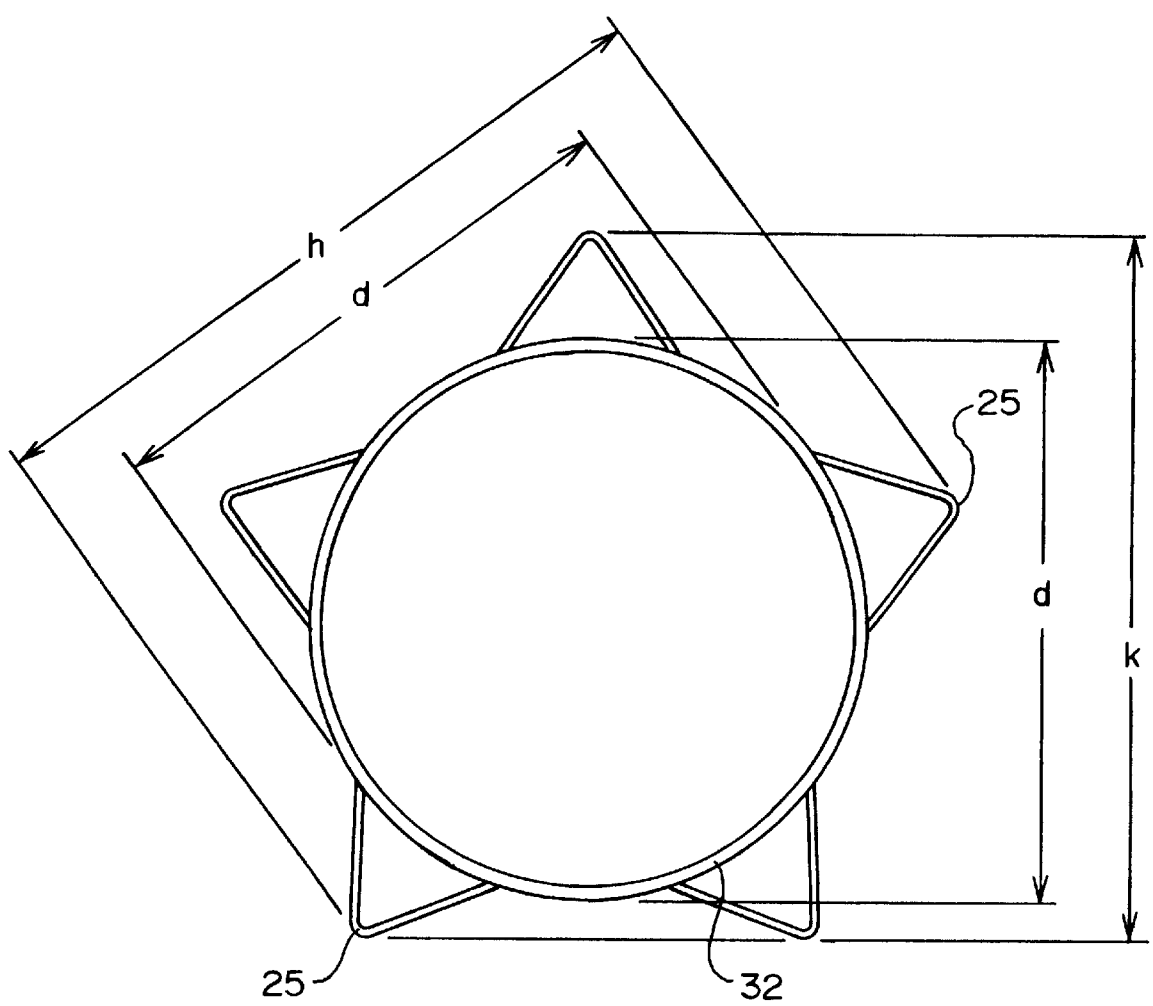

To discuss another design feature of the preferred embodiment of this invention, reference is now made to FIG. 12. It was indicated previously that one of the design criteria is that the overall size of the crab trap should not be so great as to make it too bulky to be conveniently carried on the ship or too large or unwielding to handle. The crab trap 10 of the present invention has a main frame 32, and the region defined by the circular frame member represents the main containing area. The volume within the diverting section 16 provides additional volume to the containing area, however. As indicated previously the dimension "d" is 79 millimeters in this drawing of FIG. 12 which is to scale. The maximum crosswise dimension of the crab trap 10 as shown in FIG. 12 is the dimension "h" which is across two juncture locations 25, and in this drawing of Figure measures 100 millimeters. The next largest dimension is indicated at "k", and this measures 95 millimeters. Thus, in terms of maximum lateral dimension, in the present invention these two dimensions are 100 and 95 millimeters compared to 77 millimeters which is the diameter. However, it should be noted that the overall dimension of the crab trap 12 has substantial indentations around the perimeter, so that these can be grouped more closely together as these are being positioned side by side. In addition, as indicated above, the volume contained with the diversion sections 16 adds to the overall containing capacity of the crab trap 10.

Figure 13:
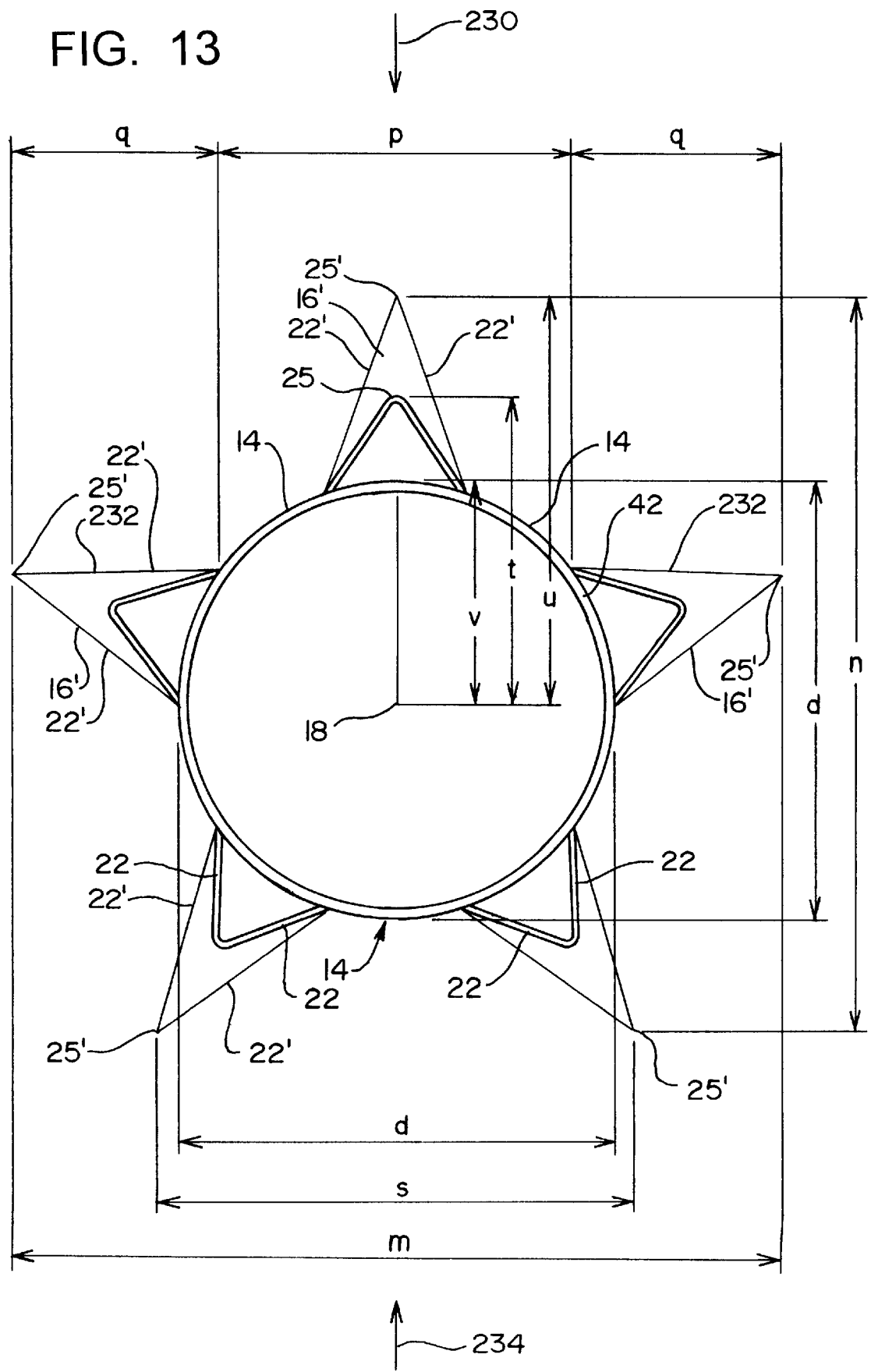

To carry this analysis further, references is now made to FIG. 13. One possible design change is to bring the two diversion wall end portions 26 closer together. Within the broader scope of the present invention, it may be possible to move the two wall sections 22 of any one diverting section 16 closer together so that these would in effect simply comprise a single wall extending radially from the center line 18. If this were done, it would not be practical to increase the lateral dimensions of the gates 14 so that these would reach to the inner ends of the wall section 16, since the gates 14 would interfere with each other as they swing inwardly. In some situations, substituting the single wall for the diverting section 16 instead of the two diverging slanting wall portions 22, the angular orientation of the single wall portion may be such so that it would provide advantages in certain situations where the flow of the current is in a particular direction. On the other hand, there would be several disadvantages. For example, the two wall sections 22 structurally form a triangular configuration which make these particularly sturdy, as opposed to cantilevering a single wall from the main frame members 42 and 36. Further, the volume provided by the present configuration of the diversion sections 16 also serves as part of the containing area, thus increasing the overall of the containing area of the trap 10. Further, these diverting sections 16 have the added advantage of providing a convenient place for the escape rings 92 to be placed.

Another possible design option is to extend the radial dimension of each of the diverting sections 16 further away from the center location 18. As shown in FIG. 13, the diverting wall portions 22 have been lengthened to move the juncture location 25 further outwardly. These are shown at 22' and 25'. Let us examine the effect of this on the operation, configuration and size of the crab trap 10.

First, we look at the overall increase in the dimensions. The maximum lateral dimension of the expanded crab trap as shown in FIG. 13 is indicated at "m", and this is 133 millimeters, as opposed to 77 millimeters for the diameter of the main frame member 42 which defines the main collecting area. The other dimension is indicated at "n", and this dimension is 126 millimeters. Thus, the rectangle which would be defined by these dimensions would be 133 millimeters by 126 millimeters for a total area of 16,800, as opposed to the corresponding rectangular area (more precisely square area) occupied by a circular configuration having the diameter of the main frame 42, this rectangular area (more precisely a square area) being about 5,900 millimeters. (It should be kept in mind that these millimeter dimensions are simply given in this instance to give relative values, so that these correspond exactly to the scale shown in the drawings of FIGS. 010 through 13. Obviously, the dimension of the full crab trap would be much larger.) Thus, the maximum rectangular area defined by the larger scale crab trap in FIG. 13 (16,800) is 285% of the rectangular area that would be occupied by a circular crab trap having a diameter of 77 millimeters which would be the same as the size of the main frame member 42.

Next we examine the lateral areas of the diversion and collecting areas. With further reference to FIG. 13, when the path is directly toward the diverting section 16', as indicated by the arrow 230 in FIG. 13, the lateral dimension of the effective diverting area is indicated at "p", and is equal to 60 millimeters, which is substantially the same as lateral dimension "b" as shown in FIG. 10 for a comparable operation of the crab trap configuration shown in FIG. 10. However, there may be some advantage for the large configuration in FIG. 13, in that the surfaces 232 of the laterally extending sections 16' may divert a portion of the crabs into the gates 16 that are adjacent to the diverting section 16 closest toward the direction of the current indicated at 230.

Let us now consider the situation where the current is in the direction indicated at 234 in FIG. 13. The lateral dimension of the diverting and collection area in this instance is indicated at "s", which is a value of 79 millimeters, in comparison to a comparable value of the lateral dimension "b" shown in FIG. 10, which is 60 millimeters. Thus, there is an increase of about 31%.

Thus, the lateral dimensions of the diversion and collecting areas can be increased by moving the juncture points 25 further radially outwardly. However, there is no increase in the volume of the main collecting area within the main frame member 42, except for the small additional volume which is given by extending the diversion sections 16 out to the location of 16'.

The radius from the center location 18 to the outer edge of the main frame member 42 indicated at "r" in FIG. 13 is about 39 millimeters. The radial distance of the juncture location of 25' of the extended diverting section 16' indicated at "u" is 68 millimeters. Present analysis would indicate that the overall radial length of each diverting section 16 should be no greater than about equal of the radius of the main containing section of the crab trap (indicated at "r" in FIG. 13. The angle formed by the planes occupied by two adjacent wall portions 28a and 28b that form a single diversion and collecting area 28 (this angle being indicated at 200 in FIG. 10) should be less than 180°, and not less than about 90°. The angle 200 could be made less than 90°, and within the scope of the present invention, this is possible, even to lower this angled was much as 45°. However, present design analysis indicates that the offsetting design compromises that would be made would dictate against this.

Also, the angle 202 (shown in FIG. 10) (the angle made by the line 204 between adjacent juncture locations 50) and the plane either of the diverting wall portion 22a or 22b should be greater than zero, and desirably not greater than 45°. Again, these could be increased beyond that, but the overall design compromises that would be required do not, at the present, indicate that this would be desirable.

It is obvious that various modification could be made to the present invention without departing from the basic teachings thereof. For example, while present analysis indicates that the preferred embodiment shown herein, where there are five gates 14 and five diversion sections 16, these could be increased in number, or possibly decreased. Further, the angular position of the diversion wall portions 22 could be modified. Also, the diversion sections 16 could have their radial dimensions increased or decreased (the radial dimension being the distance from the center location 18 of the crab trap to the juncture location 25.

While this invention has been described in terms of a preferred embodiment, it is contemplated that persons reading the preceding description and studying the drawing will realize various alterations, permutations and modifications thereof. It is therefore intended that the following appended claims are interpreted as including all such alterations and modifications as fall within the true spirit and scope of the present invention.

What is claimed:

1. A crab trap adapted to be lowered in a body of water and to rest on a floor of the body of water, said crab trap defining an enclosed containing area in which the crabs are contained, said crab trap comprising:
   a main frame having a center location and a perimeter, said main frame comprising:
      a lower perimeter frame section adapted to rest on said floor and extending around said containing area;
      an upper perimeter frame section positioned above said lower frame section and extending around said containing area;
      an interconnecting frame means interconnecting said upper and lower frame sections;
   a plurality of gates which are positioned at perimeter locations at spaced intervals around the perimeter of said main frame between said upper and lower frame sections and which provide access openings thorough which the crabs enter into the containing are,
a plurality of diversion wall sections that are positioned intermittently between said gates, each of said wall sections comprising a pair of generally upright wall portions, said wall portions of each pair having radially outward wall end portions connected to one another, and radially inward end wall portions positioned proximate to an adjacent gate, the two wall portions of each diversion wall section diverging from one another in a radially inward direction in a manner that each wall portion of one wall section on one side of a related gate forms with an adjacent wall portion of an adjacent wall section of the other side of the related gate a diverting region where the two wall portions on opposite sides of that gate provide with that gate a diverting and collecting location so that crabs traveling into that diverting and collecting location are directed to the related gate to enter that gate and be retained in the collecting area.

2. The crab trap was recited in claim 1, wherein the two wall sections of the diverting regions extend toward the related gate and form an exterior angle with one another of less than 180°.

3. The crab trap was recited in claim 2, wherein the exterior angle of the two wall sections is at least as great as about 90°.

4. The crab trap was recited in claim 1, wherein said exterior angle is between about 20° and 60°.

5. The crab trap was recited in claim 1, wherein said crab trap has a center portion and a radial dimension from said center location to an edge portion of said main frame, said diversion wall sections extending radially outwardly from said mid location a distance which is between about one and one quarter said radial dimension to twice said radial dimension.

6. The crab trap was recited in claim 5, wherein said diversion wall sections extend outwardly from said central location a dimension between about one and one third to one and two thirds of said radial dimension.

7. The crab trap was recited in claim 1, wherein the wall sections of each diversion wall section extend outwardly from one another at an angle between 0 and 90°.

8. The crab trap as recited in claim 7, wherein said angle is between 30° and 90°.

9. The crab trap as recited in claim 8, wherein said angle is at least about 45°.

10. The crab trap as recited in claim 1, further comprising an access door pivotally mounted along an axis extending across said upper perimeter frame section, said access door being spring loaded to move from a closed position to an open position, and latch means holding said access door in its closed position.

11. The crab trap as recited in claim 10, wherein there is a metal screen extending across said upper perimeter frame section and is placed in, and connects to, said access door to extend over said access door, said metal screen being spring loaded in tension so as to urge said access door to its open location.

12. The crab trap as recited in claim 1, further comprising escape ring means which is mounted between a pair of wall portions of one of said diversion wall sections.

13. The crab trap as recited in claim 12, wherein said escape ring means is positioned at said one of said diversion wall sections so as to be located radially outwardly of said main frame.

14. The crab trap set forth in claim 13, wherein the attachment means for attaching the escape ring to the main frame comprises a cord made of material that will rot over a period of a few months causing the escape ring means to detach from the crab trap thereby permitting the crabs retained by the trap to escape.

15. The crab trap set forth in claim 1, wherein the lower perimeter frame member is weighted by being filled with a heavy substance.

16. The crab trap as recited in claim 1, wherein there are at least four diversion wall sections and no more than eight diversion wall sections positioned around said perimeter frame.

17. The crab trap as recited in claim 16, wherein there are between about five to seven diverting wall sections.

18. A method of catching crabs in a body of water, said method comprising:
   a. lowering a crab trap defining an enclosed containing area in which the crabs are to be contained, said crab trap comprising
      i. a main frame having a center location and a perimeter, said main frame comprising a lower perimeter frame section adapted to rest on said floor and extending around said containing area;
   an upper perimeter frame section positioned above said lower frame section and extending around said containing area;
   an interconnecting frame means interconnecting said upper and lower frame sections;

ii. a plurality of gates which are positioned at perimeter locations at spaced intervals around the perimeter of said main frame between said upper and lower frame sections and which provide access openings through which the crabs enter into the containing area;

b. providing said crab trap with a plurality of diversion wall sections that are positioned intermittently between said gates, each of said wall sections comprising a pair of generally upright wall portions, said wall portions of each pair having radially outward wall end portions connected to one another, and radially inward end wall portions positioned proximate to an adjacent gate, the two wall portions of each diversion wall section diverging from one another in a radially inward direction in a manner that each wall portion of one wall section on one side of a related gate forms with an adjacent wall portion of an adjacent wall section of the other side of the related gate a diverting region where the two wall portions connected to that gate provide with that gate a diverting and collecting location so that crabs traveling into that diverting and collecting location are directed to the related gate to enter that gate and be retained in the collecting area;

c. lowering said crab trap into the body of water and causing it to rest on a floor of the body of the water, in a manner that crab traveling through the body of water encounter one of the diverting regions and are directed into the related gate to enter into the containing area.

19. The method as recited in claim 18, wherein said crab trap has a center portion and a radial dimension from said center location to an edge portion of said main frame, said diversion wall sections extending radially outwardly from said mid location a distance which is between about one and one quarter said radial dimension to twice said radial dimension.

20. A crab trap adapted to be lowered in a body of water and to rest on a floor of the body of water, said crab trap defining an enclosed containing area in which the crabs are contained, said crab trap comprising:

a main frame having a center location and a perimeter, said main frame comprising:
  i. a lower perimeter frame section adapted to rest on said floor and extending around said containing area;
  ii. an upper perimeter frame section positioned above said lower frame section and extending around said containing area;
  iii. an interconnecting frame means interconnecting said upper and lower frame sections;

a plurality of gates which are positioned at perimeter locations at spaced intervals around the perimeter of said main frame between said upper and lower frame sections and which provide access openings through which the crabs enter into the containing area;

a plurality of diversion wall sections that are positioned intermittently between said gates, each of said wall sections comprising a pair of generally upright oppositely disposed wall surfaces having a radially outward end portion and radially inward end portions positioned toward an adjacent gate, the two wall surfaces of each diversion wall section extending in a radially inward direction in a manner that each wall surface of one wall section on one side of a related gate forms with an adjacent wall surface of an adjacent wall section of the other side of the related gate a diverting region where the two wall surfaces on opposite sides of that gate provide with that gate a diverting and collecting location so that crabs traveling into that diverting and collecting location are directed to the related gate to enter that gate and be retained in the collecting area.

* * * * *